United States Patent
Salot et al.

(10) Patent No.: US 10,334,468 B2
(45) Date of Patent: Jun. 25, 2019

(54) SCALABLE CONTROL PLANE

(71) Applicant: CISCO TECHNOLOGY, INC., San Jose, CA (US)

(72) Inventors: Nirav Salot, Pune (IN); Sridhar Bhaskaran, Coimbatore (IN); Sebastian Speicher, Wallisellen (CH); Maulik Vijay Vaidya, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 57 days.

(21) Appl. No.: 15/285,403

(22) Filed: Oct. 4, 2016

(65) Prior Publication Data

US 2017/0099612 A1 Apr. 6, 2017

Related U.S. Application Data

(60) Provisional application No. 62/237,293, filed on Oct. 5, 2015.

(51) Int. Cl.
*H04W 28/02* (2009.01)
*H04W 40/02* (2009.01)
*H04L 12/741* (2013.01)

(52) U.S. Cl.
CPC ....... *H04W 28/0215* (2013.01); *H04L 45/745* (2013.01); *H04W 28/0273* (2013.01); *H04W 40/02* (2013.01)

(58) Field of Classification Search
CPC ..... H04W 40/02; H04W 40/20; H04W 48/18; H04W 92/02; H04L 12/14–12/1407; H04L 45/04
See application file for complete search history.

(56) References Cited

U.S. PATENT DOCUMENTS

| | | | |
|---|---|---|---|
| 2010/0142517 A1* | 6/2010 | Montemurro | H04L 63/20 370/352 |
| 2012/0224531 A1* | 9/2012 | Karuturi | H04L 67/327 370/328 |
| 2015/0244537 A1* | 8/2015 | Paquette | H04W 4/24 370/259 |

OTHER PUBLICATIONS

Hattachi, R., et al., NGMN 5G white paper, Next Generation Mobile Networks, Feb. 17, 2015, 125 pages; http://ngmn.org/uploads/media/NGMN_5G_White_Paper_V1_0.pdf.
5G Vision White Paper, DMC R&D Center, Samsung Electronics Co., Ltd., Feb. 2015, 16pages.

* cited by examiner

*Primary Examiner* — Pao Sinkantarakorn
(74) *Attorney, Agent, or Firm* — Patterson + Sheridan, LLP

(57) ABSTRACT

In an example, there is disclosed a computing apparatus, having: a processor; a memory; a network interface to communicatively couple to a mobile data network; and an interconnection and routing function (IRF) server engine to: receive an incoming Control plane message from a source network function (NF) via the network interface; examine a header of the incoming Control plane message to determine a destination NF of the Control plane message; and route the Control plane message to the destination NF.

20 Claims, 9 Drawing Sheets

SCALABLE CONTROL PLANE

CROSS REFERENCE TO RELATED APPLICATIONS

This Application claims priority to U.S. Provisional Application Ser. No. 62/237,293, filed Oct. 5, 2015, titled "Scalable Control Plane and Service Creation," which is incorporated herein by reference

FIELD OF THE SPECIFICATION

This disclosure relates in general to the field of wireless communication, and more particularly, though not exclusively to, a scalable control plane.

BACKGROUND

The Third-Generation Partnership Project (3GPP) is an organization that propagates wireless telecommunication standards and promotes their adoption. 3GPP has provided useful standards such as global system for mobile communication (GSM), enhanced data rates for GSM evolution (EDGE), code division multiple access (CDMA), universal mobile telecommunication system (UMTS), and long-term evolution (LTE).

Certain of these standards provide for a base station such as a NodeB, evolved node B (eNodeB), femtocell, home eNodeB (HeNB), or similar to operate one or more carriers on a defined UMTS Terrestrial Radio Access (UTRA) Absolute Radio Frequency Number (UARFCN).

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
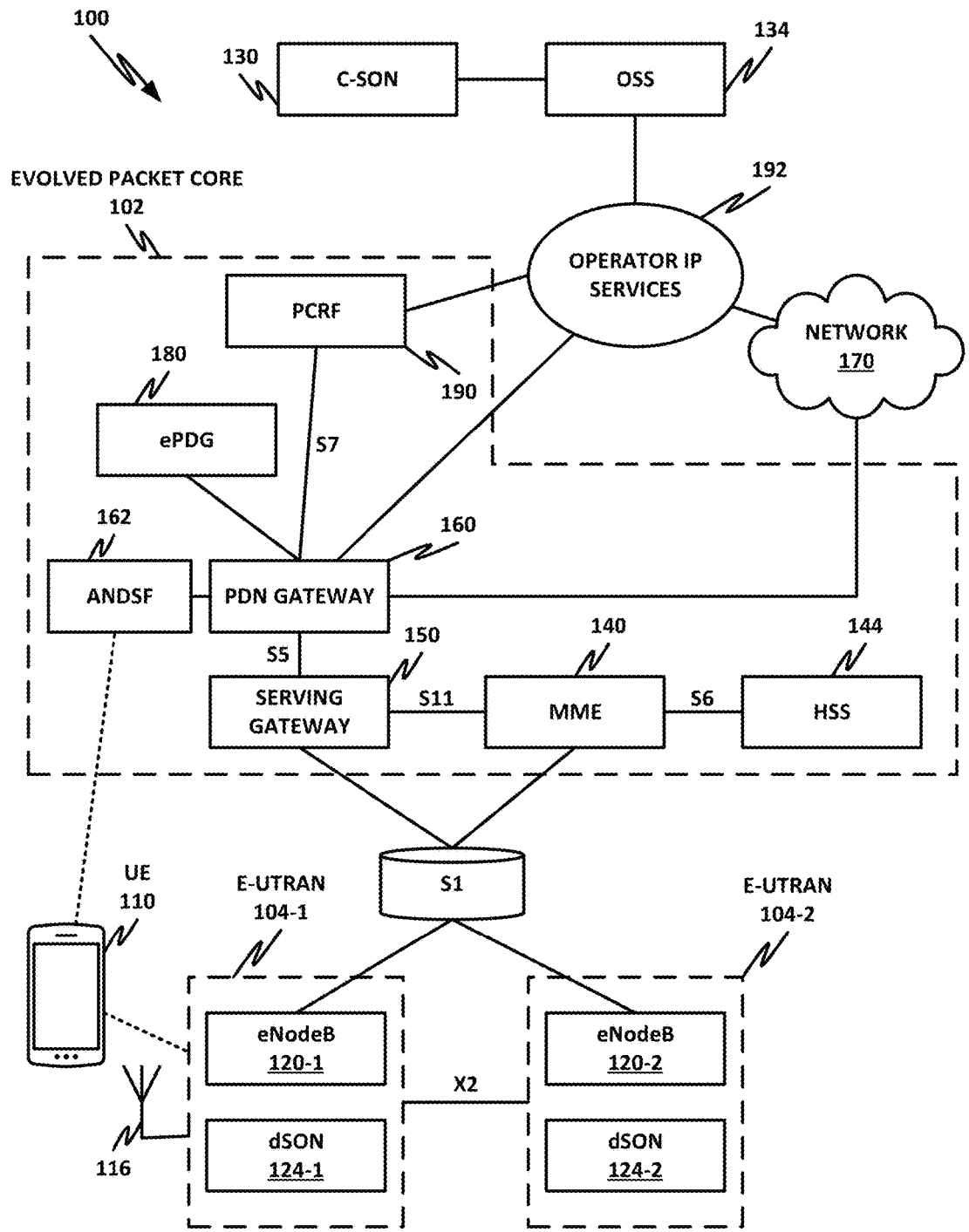
FIG. 1 is a network-level diagram of a mobile network, such as a long-term evolution (LTE) network according to one or more examples of the present specification.

In an example, there is disclosed a computing apparatus, having: a processor; a memory; a network interface to communicatively couple to a mobile data network; and an interconnection and routing function (IRF) server engine to: receive an incoming Control plane message from a source network function (NF) via the network interface; examine a header of the incoming Control plane message to determine a destination NF of the Control plane message; and route the Control plane message to the destination NF.

EMBODIMENTS OF THE DISCLOSURE

The following disclosure provides many different embodiments, or examples, for implementing different features of the present disclosure.

There are several limitations of the existing communication model for 3GPP. For example, in legacy systems, much of the focus was on the user-plane, with goals such as reducing latency, increasing bandwidth, and supporting a wider range of coverage options. There have been fewer efforts to focus on making improvements to the control plane.

In 3GPP, the "control plane" may refer to the medium for communication between control-plane functions and entities of the mobile packet core. For example, the control plane feeds radio characteristic-related information, such as radio access technology (RAT) type and service network into the core network. This supports critical functions such as charging and policy decisions that are essential for service deployment. The control plane is instrumental in ensuring service agility, reducing the operational cost and monetizing the network assets.

However, compared to the data plane, the control plane has seen relatively less evolution since the time when GPRS was state of the art. Indeed, compared to GPRS, the primary difference in EPS is that many new nodes and new interfaces have been added. And rather than representing new innovations, this proliferation of nodes and interfaces has simply increased the complexity of the control plane. The other primary change has been an upgrade in protocol from GPRS tunneling protocol (GTP) version 1 to GTP version 2. While this introduced improvements, no fundamental changes were made. The major change is only terms of protocol used: GTPv2 instead of GTPv1; Diameter instead of RADIUS, etc.

In retrospect, optimization goals for the GTE control plane included the following:
  a. Optimization: Reducing the number of bytes exchanged in a message; Reducing number of messages; Piggybacking of information over existing messaging
  b. Special purpose hardware-based platform: Physical node having well-defined capacity to handle number of messages/sec
  c. Special purpose protocols: Protocol defined based on the functionality supported on a specific interface The result was the following communication model:
  a. A interfaces with B, B interfaces with C. A cannot interface with C directly, so information flow from A to C is always via B. For example, location reporting between the MME and PCRF always involves SGW and PGW. The flow of is information rigid.

b. Support from B is needed to pass information from A to C. For example, PCRF support is needed for providing congestion information from the RAN congestion awareness function (RCAF) to the traffic detection function (TDF). But it is difficult to roll out new features easily.

c. A exposes certain functions over the interface towards B. A always assumes that B is the peer for a given interface. To expose the same set of functions over a different interface (for example, toward D) requires a new support structure. For example, PCRF supports RAT type change notification over Sd, but does not support it over Rx. Thus it is difficult to introduce d. Each interface of A is based on a specific protocol to suit the corresponding functionality. A supports x different interfaces and y different protocols. For example, the PGW supports 7 different interfaces and 4 different protocols. This makes implementation and test complex.

Some issues are partly addressed by virtualizing software defined networking (SDN). This provides a uniform platform across services and a higher platform re-usability quotient. This also provides ease of node life-cycle management and ease of laying out connectivity between nodes. But virtual nodes still have to support the same set of features and functions within the existing communication model, including multiple interfaces and protocols.

But virtual nodes must still support the same set of features and communication models for information exchange, including the multiple interfaces and protocol. Thus, except for the virtual platform itself, there is no difference in complexity between virtual and non-virtual network functions.

To address some of the limitations in the legacy control plane model, this specification a scalable, efficient and simplified interconnection model for CN control plane NFs, including:

a. Extendable, scalable while maintaining efficient communication path between NFs: The interconnection model allows easy insertion of new NFs in the future while maintaining the efficient communication path between new and existing NFs, without increasing the overall complexity of the system. Hence, an interconnection model allowing communication between any CN control plane NFs is preferred over the traditional point-to-point interface based model.

b. Reduced complexity of NFs and overall system while ensuring multi-vendor deployment: The interfaces are open and standardized for allowing multi-vendor NG CN while there is no real need for defining multiple (e.g. one per each peer NF) interfaces and corresponding number of protocols. Thus, by defining one standardized interface over which the NF provides all its functionality, the overall complexity of the NFs is reduced, and the total number of interfaces in the system is reduced while ensuring the architecture that allows multi-vendor CN deployment.

c. Cost-effective and agile for development and for deployment: Reducing complexity of NF allows cost-effective and faster development of new features. In turn, this results in an overall system that is relatively agile for rolling out of new features and services.

d. Generic user-plane architecture: Various user-plane scenarios (e.g. access to local and centralized data networks (in both the visited and the home network in roaming situations), data forwarding for session continuity and other purposes, etc.) are supported by the NG system. While the scenarios differ, the actual functionality required to support them can be reduced to a rather small set of basic user-plane operations.

Therefore, a generic user-plane architecture supporting various operations (forwarding operations to other user-plane functions/data networks/the control-plane, bitrate enforcement operations, service detection operations, etc.) is defined. One or multiple user-plane functions per session can be activated and configured by the control-plane as needed for a given user-plane scenario.

To this end, the present specification discloses an interconnection and routing function (IRF) to be used in a next-generation wireless communication architecture. The IRF replaces the existing point-to-point interconnects between existing network functions (NFs), and instead provides a generalized and scalable control plane that is shared between the various NFs.

A set of example NFs and some of their associated protocols are illustrated in FIG. 1. The NFs disclosed in FIG. 1 are not an exhaustive list of all available NFs, and in the future, new NFs may be defined. In a general sense, an NF provides a service on the telecommunication network. In some cases, other NFs may need to gain access to data or information provided by that NF. The IRF of the present specification provides a medium for those NFs to share data without the need for highly specific point-to-point interfaces. An IRF is illustrated in greater detail in connection with FIGS. 6 and 7. Some general principles of the IRF are described below.

Each NF interfaces with the IRF via a given reference point in its own public land mobile network (PLMN). NFs do not interface with each other directly, but can communicate (i.e., send request or response messages) with each other via IRF. When required, this model allows any NF to communicate with any other NF directly without involving any unrelated third-party NFs in the flow. For example, NF1 can send a message to NF3 via IRF without involving NF2, assuming NF2 is not directly needed in the transaction. This is different from, for example, a legacy configuration where an MME, for example, could not communicate directly with a PCRF without first traversing an SGW and PGW.

In the IRF model, each NF supports only one reference point towards the IRF. All the procedures towards the other NFs are supported over this single reference point. For example, NF1 supports Rp1 towards IRF, instead of supporting Rpa towards NF2, Rpb towards NF4, and so on.

The NFs are not required to maintain interface layer associations for each peer-NF in the network, and thus providing connectionless communication with NFs. However, in certain embodiments, the application layer state for the UE session is required to be maintained. If the NF wants to change its instance (e.g. VM instance) for a given UE's session (e.g. to support scale-in, scale-out and restoration features), it may update the IRF and not the peer-NFs. For example, NF1 can move a UE's session from its instance1 to instance2 and update the IRF with the new instance number while there is no need to update NF2, NF3, NF4, and so on.

The IRF is mainly responsible for routing of message between NFs. The source NF is responsible for determining the destination NF for its message and populating it in the message header. The IRF examines the message header to determine the interface layer identity (e.g., instance number) of the destination NF for the UE's session and routes it to the appropriate NF. For the routing purpose, the IRF maintains a repository of the binding between the UE's identity and interface layer identity of the serving NFs.

If the procedures over the reference point between the NF and IRF are defined generically, this model allows re-use of those procedures by any other NF in the network. For example, if NF1 supports procedures such as "UE location change reporting" or "UE congestion level change reporting" without restricting which other NFs in the network can invoke it, then both NF2 and NF5 can invoke the procedure without any special support or changes to the procedure. This can also be achieved via a subscribe-notify mechanism for appropriate procedures. For example, NF2 and NF5 subscribe to the "UE location change reporting" from NF1. NF1 keeps the subscription information, and when UE location changes takes place, NF1 notifies both NF2 and NF5 via the common IRF. In the future, if NF6 also needs to subscribe to the same procedure, it can do so without any special support. Note however that if there is some reason to restrict access to a procedure, NF1 can define the procedure strictly for use by NF2, and can restrict all other NFs from accessing it.

The IRF disclosed herein also enables other architectural innovations to next-generation cellular networks (NG CN). In particular, IRF allows greater flexibility in defining new NFs, because there is no need to define specific interfaces for each. Thus, architectural improvements could include the following, by way of non-limiting example:

a. Separation of control and user plane functions: For allowing independent scaling of control and user plane functions their separation may be desirable. In an example, principles of Rel-14 CUPS feature are followed, i.e. control plane dynamically configures user-plane functions (i.e. activates various operations of the user-plane functions as needed) to provide the traffic handling functionality needed for a session.

b. Standalone Subscriber DB: Since the subscriber DB is mainly responsible for subscription profile management, it belongs to the database domain, while other NFs in the CN mostly belong to the networking domain. For the independent evolution of Subscriber DB, which is linked to the evolution of the database domain, it should be separated from the other NFs in CN.

c. Separated multimedia message (MM) and short message (SM) control functions. MM and SM control functions may be separated into standalone NFs:

i. Support for home-routed roaming architecture: In the home-routed roaming architecture, the MM control function may be part of visiting PLMN while the SM control function may be within the home PLMN. For home-routed roaming scenarios, some subset of the SM functionality, e.g. selection and programming of the user plane function in the visiting PLMN for inter-operator charging, may be supported in the visiting PLMN as well. This can be part of the MM function.

ii. Support for Gateway CN-like network sharing configuration: Under the Gateway CN network sharing configuration of EPC, the functionality supported by MM control function is hosted by the mobile network operator (MNO) while the functionality supported by the SM control function is hosted by the mobile virtual network operator (MVNO) (e.g. enterprise customer). To support this basic network sharing configuration in NG, there may be defined a standalone MM control function and SM control function.

iii. Support for UE simultaneously accessing multiple network slices: In this case, the MM functionality may be part of common control function while the SM functionality may be part of slice specific control function.

iv. Separating the access related and PDU session functionality: The PDU session management functions (the core functionality of SM control function) which include charging, UL/DL service level rate enforcement etc. are common for all types of accesses. These are very different compared to the access related functions (the core functionality of MM control function) which include registration management, reachability management, mobility restriction etc. Thus they may be separated, for example, for independent evolution, independent scaling purpose, and for distributed v/s centralized deployment.

d. Access common CN design: By defining unified authentication framework, NAS protocol which is common to all the accesses and (R)AN-CN interface which is common to all the accesses, there can be defined an access common CN. This CN supports functionality specific to an access (e.g. CN idle mode reachability management) as well as common to all the accesses (e.g. PDU session establishment). Thus, NG1, NG2 and NG3 interfaces which are common to the 3GPP as well as non-3GPP accesses are used.

e. Single termination point for NG1 in CN, for a given access: This also allows a single security association between the UE and the CN for a given access. This also satisfies architecture principles to minimize number of reference points between the UE and the NG CN for the control plane over a single (R)AN.

f. Standalone Authentication function: For supporting unified authentication framework and for supporting UEs which may support only subset of 5G functionality (e.g. not supporting MM functionality), the authentication function may be separate from the MM function. This also allows centralized deployment of the authentication function and distributed deployment of MM function. The authentication function is also kept separate from the subscriber DB, since both of them belong to a different technology domain, i.e. networking v/s database.

g. Standalone Application Function: The Application Function could belong to a third party and thus be part of a different administrative domain compared to NG CN. Thus, it may be defined as standalone NF.

A system and method for providing a scalable control plane will now be described with more particular reference to the attached FIGURES. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiment many have different advantages, and no particular advantage is necessarily required of any embodiment.

In some embodiments, hyphenated reference numerals, such as 10-1 and 10-2, may be used to refer to multiple instances of the same or a similar item 10, or to different species of a genus 10.

FIG. 1 is a block diagram of a mobile network 100 according to one or more examples of the present Specification. In this specific example, a fourth-generation long-term evolution (4G LTE, or simply LTE) network is disclosed by way of non-limiting example, including legacy 3GPP point-to-point interfaces. In certain embodiments, LTE is used primarily for data transfer, so that mobile network 100 may also provide, in addition to the elements shown here, structure for handling voice communication, which may communicatively couple to a public-switched telephone network (PSTN). In some cases, voice over LTE (VoLTE) may also be provided. It should also be noted that LTE is disclosed only as one possible embodiment of the teachings of this Specification, and that the teachings may be relevant to other telecommunication structures now in existence or later developed, and the scope of this Specification is intended to encompass such structures where applicable.

In this example, mobile network 100 includes user equipment (UE) 110 communicatively coupled, for example via a wireless antenna 116, to an evolved UMTS radio access network (E-UTRAN) 104. UE 110 may initiate a data transaction or session with E-UTRAN 104-1, referred to herein as a "data call." E-UTRAN 104 communicatively couples to an evolved packet core (EPC) 102, for example via wired connections. E-UTRAN 104 may include, by way of non-limiting example, an evolved NodeB (eNB) 120, which acts as a wireless base station, and a distributed self-organizing network (dSON) controller 124.

In various embodiments, these functions may be provided by dedicated servers or appliances. In other embodiments, select functions may be provided in virtual environments, such as a rack-mounted server providing various functions in a hypervisor. In a general sense, the various UE-class devices, server-class devices, network functions, may be generally classified as "computing devices." As used throughout this Specification, a computing device includes any electrical or electronic device based on the Von Neumann architecture, including a processor with a control unit and logic unit, and a memory. In that context, it should be understood that the Von Neumann architecture may be provided either as a physical device, or as a virtual machine or hypervisor running at one or more layers of abstraction from the physical hardware.

In this example, two E-UTRANS 104-1 and 104-2 are disclosed to illustrate the mobile nature of the network. UE 110 may move, for example, as a user carrying UE 110 moves. As UE 110 moves farther away from E-UTRAN 104-1, its signal to E-UTRAN 104 will attenuate. If UE 110 simultaneously moves closer to E-UTRAN 104-2, its signal with E-UTRAN 104-2 will become stronger. When UE 110 has moved such that it gets a stronger signal to E-UTRAN 104-2 than to E-UTRAN 104-1, E-UTRAN 104-1 may hand off the data call to E-UTRAN 104-2, so that E-UTRAN 104-2 seamlessly continues handling the data call.

Handoff may be handled over the X2 interface. In this example, two classes of signals are passed within mobile network 100: voice, data, and call signals (referred to herein as the "user plane" signals) and control signals (referred to herein as the "control plane" signals). X2 provides both a control plane interface and a user plane interface, and in an embodiment is a wired connection between the two E-UTRANs 104. The protocol structure of the S1 control plane is based on stream control transmission protocol/ internet protocol (SCTP/IP). The user plane provides a protocol structure based on general packet radio service (GPRS) tunneling protocol/user datagram protocol/IP (GTP/ UDP5/IP). On the user plane, a transport bearer may be identified by an IP address and one or more GTP tunneling endpoint IDs (TEID). X2 operates as a meshed interface, meaning that a plurality of eNBs 120 may all be linked together. Properly configured, X2 helps to minimize packet loss as UE 110 hands off from one E-UTRAN 104 to another. Specifically, when the data call is handed off, unsent or unacknowledged packets stored in the old eNB 120's queues can be forwarded or tunneled to the new eNB 120 via the X2 interface.

E-UTRANs 104 communicatively couple to an EPC 102 via an S1 interface. As with the X2 interface, S1 provides both a control plane and a user plane, configured similarly to the respective X2 control plane and user plane. In an embodiment, the S1 application protocol (S1-AP) is mapped directly on top of SCTP.

In this example, EPC 102 includes a serving gateway (SGW) 150, a mobility management entity (MME) 140, a home subscriber server (HSS) 144, a packet data network (PDN) gateway 160, an evolved packet data gateway (ePDG) 180, and policy and charging rules function (PCRF) 190. EPC 102 for its part may communicatively couple, via appropriate interfaces, to a public network such as internet 170, or to operator IP services 192.

When UE 110 is performing data operations, such as web applications, web surfing, e-mail, or other network operations, UE 120 connects to Internet 170 via mobile network 100. In one example scenario, user plane signals originate from UE 110 and are passed to E-UTRAN 104. Within E-UTRANs 104, user plane signals are first received by eNB 120 (or other similar base station), which interfaces with EPC 102 to handle the data call.

As a wireless local area network (WLAN) access point (WAP), eNB 120 supports Layer 1 and Layer 2 of the E-UTRAN orthogonal frequency division multiplexing (OFDM) physical interface. Advantageously, eNBs 120 may directly connect to a network router, thus simplifying network architecture. eNB 120 may support certain legacy features related to physical layer procedures for transmitting and receiving, including modulation and demodulation, and channel encoding and decoding. eNB 120 may also provide radio resource control and radio mobility management for processing handovers.

EPC 102 provides several functional blocks to provide various support functions. These are described herein by way of non-limiting example only.

MME 140 provides control functions to EPC 102. MME 140 provides idle mode UE paging and tagging procedures, including retransmissions. MME 140 also provides bearer activation and deactivation support, and may choose an appropriate SGW 150 for UE 110 when UE 110 initially attaches to EPC 102 via E-UTRAN 104. After attachment, MME 140 authenticates UE 110 via HSS 144.

Non Access Stratum (NAS) signaling terminates at MME 140, and MME 140 is also responsible for generating and allocating a temporary identity for UE 110. MME 140 then verifies the authorization of UE 110 to resources on the service provider's public land mobile network (PLMN), and enforces roaming restrictions on UE 110. MME 140 is also a terminal endpoint for ciphering/integrity protection for NAS signaling, and handles security key management. MME 140 also supports lawful signal interception. MME 140 also provides control plane functions for mobility between LTE and 2G/3G networks with the S3 interface terminating at MME 140 from, for example, a 3G serving GPRS support node (SGSN). Finally, MME 140 terminates the Sha interface of HSS 144 for roaming UEs.

HSS 144 is, in an embodiment, a database server to provide home location register (HLR) and authentication center (AuC) services. The functions of the HSS include call and session establishment support, user authentication, and access authorization, by way of non-limiting example.

In an embodiment, HLR stores and updates a user subscription information database. This may include the following, by way of nonlimiting example:
  a. User identification and addressing, including the International Mobile Subscriber Identity (IMSI), Mobile Subscriber ISDN Number (MSISDN), and/or mobile telephone number.
  b. User profile information, including subscriptions and quality of service (QoS) data.

AuC generates security data from user identity keys, and provides the data to at least the HLR, and as necessary, to other functional blocks.

SGW 150 forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN Gateway 150). When UE 110 is idle, SGW 150 terminates the downlink data path and triggers paging when downlink data arrives for UE 110. SGW 150 may also store UE contexts including parameters of the IP bearer service and network internal routing information. It also performs replication of the user traffic in case of lawful interception.

PDN Gateway 160 provides connectivity from UE 110 to external packet data networks (PDNs) and provides both an entry point and exit point for UE traffic. UE 110 may simultaneously connect to more than one PDN Gateway 150, and thus may access multiple PDNs. In an example, PDN Gateway 150 provides policy enforcement, packet filtering on a per-user basis, charging support, lawful interception, and packet screening, by way of nonlimiting example.

Access Network Discovery and Selection Function (ANDSF) 162 helps UE 110 discover non-3GPP access networks, such as Wi-Fi or WIMAX, that can be used in addition to the LTE network for data communication. ANDSF 160 may provide UE 110 with rules policing the connection to such networks. ANDSF 160 may provide the following to UE, by way of non-limiting example:
  a. Inter-system mobility policy (ISMP)—network selections rules for when UE 110 has no more than one active access network connection (e.g., either LTE or Wi-Fi).
  b. Inter-system routing policy (ISRP)—network selection rules for when UE 110 has potentially more than one active access network connection (e.g., both LTE and Wi-Fi). In this case, UE 110 may employ IP flow mobility, multiple-access PDN connectivity (MAPCON), or non-seamless Wi-Fi offload according to policy and user preferences.
  c. Discovery information—a list of networks that may be available in the vicinity of UE 110, and information to help UE 110 connect to these networks.

ANDSF 162 may communicates with the UE 110 over the S14 reference point, which in some embodiments is specific to ANDSF.

PCRF 190 provides, in an embodiment, both policy decision functions (PDF) and charging rules functions (CRF).

PDF makes policy decisions. Specifically, when an IP multimedia subsystem (IMS) is set up, session initiation protocol (SIP) data include media requirements, which the terminal and proxy call session control function (P-CSCF) may exchange between themselves. During the session establishment process, the PDF may also receive those requirements from the P-CSCF and make decisions based on network operator rules. These may include, by way of non-limiting example:
  a. Allowing or rejecting a media request.
  b. Using new or existing PDP context for an incoming media request.
  c. Checking allocation of resources against authorized resource usage.

The CRF provides operator-defined charging rules applicable to each service data flow. The CRF selects the relevant charging rules based on information provided by the P-CSCF, such as Application Identifier, Type of Stream (audio, video, etc.), or Application Data Rate, by way of nonlimiting example.

ePDG 180 secures data transmission with a UE 110 connected to EPC 102 over an untrusted, non-3GPP access. For this purpose, the ePDG acts as a termination node of IPsec tunnels established with UE 110.

Network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Network 170 may also include one or more servers, firewalls, routers, switches, security appliances, antivirus servers, or other useful network devices. In this illustration, network 170 is shown as a single network for simplicity, but in some embodiments, network 170 may include a large number of networks, such as one or more enterprise intranets connected to the Internet.

Operator IP services 192 include services provided by an operator of EPC 102. Operator IP services 192 may include, or may communicatively couple to an operations support system (OSS) 132. OSS 132 provides hardware and software for monitoring, controlling, analyzing, and managing EPC 102.

Advantageously, LTE provides for self-organizing networks (SONs) (also sometimes called a self-optimizing network, which is used interchangeably). SON provides automation methods to facilitate planning, configuring, managing, optimizing, and healing a network such as EPC 102 and E-UTRAN 104.

SON may be provided in different flavors, including for example centralized SON (C-SON) 130, distributed SON (dSON) 124, and in some cases hybrid SON (hSON).

C-SON 130 provides centralized higher-level network control, with increased coordination between nodes for functions such as load balancing across a wide geographic area. In contrast, dSON 124 provides a distributed, peer-to-peer control function, in which each E-UTRAN network wirelessly receives reported parameters from other E-UTRANs, and makes autonomous decisions based on those reports. hSON (not shown in this illustration) provides a hybrid solution in which some functions are centralized and others are distributed.

Advantageously, SON provides useful functions such as:
  a. Self-configuration. In a self-configuration network, new base stations are automatically configured and integrated into the network, and new features on a base station are also seamlessly integrated. When a new base station is introduced into the network and powered on, it is immediately recognized and registered by the network. The neighboring base stations then automatically adjust to provide the required coverage and capacity, as well as to avoid the interference.

b. Self-Optimization. Base station such as eNBs 120 may provide configuration parameters intended to control and/or optimize their behavior. Based on observations of both eNB 120 itself, and measurements at UE 110 or elsewhere, a SON may automatically reconfigure these parameters to enhance network efficiency. In another embodiment, SON provides automatic neighbor relations (ANR), and optimizes random access parameters or mobility robustness. In yet another embodiment, SON switches off some number of base stations at night to conserve power. These base stations may be selected to ensure that full coverage is still provided in a coverage area. Neighboring base station may reconfigure appropriate parameters to ensure full coverage and adjust to the changed network topology. If a sudden spike in demand occurs, one or more sleeping base stations may wake up almost instantaneously. This may realize significant power savings without sacrificing network c. Self-Healing. If a network node (such as an eNB 120) goes down, self-healing helps to mitigate the effect of the failure on the overall network. For example a SON may adjust parameters and algorithms in adjacent eNBs 120 so that they can continue to provide service to the failed eNB 120. This is in contrast to legacy networks, where substantial time and resources may need to be committed to repairs when a base station fails. With self-healing networks, the network may automatically and nearly-instantaneously self-adjust with little or no service interruption.

Figure 2:
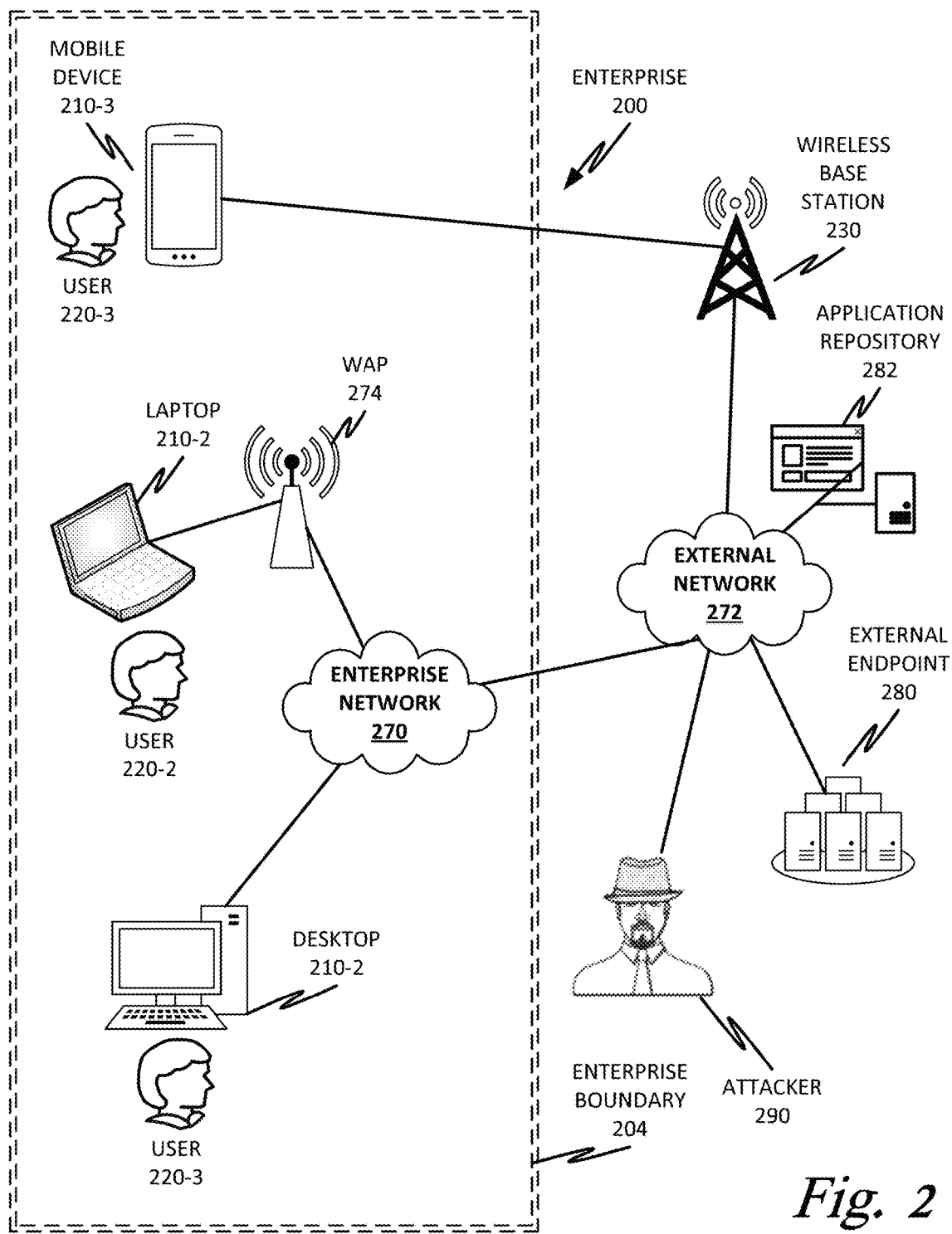
FIG. 2 is a network-level diagram of an enterprise network according to one or more examples of the present specification.

FIG. 2 is a network-level diagram of a networked enterprise 200 according to one or more examples of the present Specification. Enterprise 200 may be any suitable enterprise, including a business, agency, nonprofit organization, school, church, or home/family network, by way of non-limiting example. In the example of FIG. 2, a plurality of users 220 operate a plurality of endpoints or client devices 210, which may be UE-class devices. Specifically, user 220-1 operates desktop computer 210-1. User 220-2 operates laptop computer 210-2. And user 220-3 operates mobile device 210-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 210-1, which in one embodiment may be an engineering workstation, may be more likely to use one of Microsoft Windows, Linux, Unix, or Mac OSX. Laptop computer 210-2, which is usually a portable off-the-shelf device with fewer customization options, may be more likely to run Microsoft Windows or Mac OSX. Mobile device 210-3 may be more likely to run Android or iOS. However, these examples are for illustration only, and are not intended to be limiting.

Client devices 210 may be communicatively coupled to one another and to other network resources via enterprise network 270. By way of example, laptop computer 210-2 connects to enterprise network 270 via wireless access point (WAP) 274, which may be for example a Wi-Fi router. WAP 274 may operate on a wireless protocol such as IEEE 802.11 standards or similar. Mobile device 210-3 may connect to an E-UTRAN 104, and via proxy services (for example) may access resources on enterprise network 270.

Enterprise network 270 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 270 may also include one or more servers, firewalls, routers, switches, security appliances, antivirus servers, or other useful network devices, along with appropriate software. In this illustration, enterprise network 270 is shown as a single network for simplicity, but in some embodiments, enterprise network 270 may include a large number of networks, such as one or more enterprise intranets connected to the Internet. Enterprise network 270 may also provide access to an external network 272, such as the Internet.

Networked enterprise 200 may encounter a variety of "network objects" on the network. A network object may be any object that operates on, interacts with, or is conveyed via enterprise network 270. In one example, objects may be broadly divided into hardware objects, including any physical device that communicates with or operates via the network, and software objects.

Networked enterprise 200 may communicate across enterprise boundary 204 with external network 272. Enterprise boundary 204 may represent a physical, logical, or other boundary. External network 272 may include, for example, websites, servers, network protocols, and other network-based services. In one example, network objects on external network 272 include E-UTRAN 104, EPC 102, an application repository 230, an external endpoint 280, and an attacker 290. External endpoint 280 may be a website that one or more users 220 want to legitimately access, or may provide a remote service to users 220. It may be a goal for enterprise 200 to provide access to desirable services, while excluding malicious objects such as attacker 290, or malware that may infect enterprise network 270.

In some cases, networked enterprise 200 may provide policy directives that restrict the types of applications that can be installed from application repository 230. Thus, application repository 230 may include software that is not negligently developed and is not malware, but that is nevertheless against policy. For example, some enterprises restrict installation of entertainment software like media players and games. Thus, even a secure media player or game may be unsuitable for an enterprise computer. A security administrator may be responsible for distributing a computing policy consistent with such restrictions and enforcing it on client devices 210.

Figure 3:
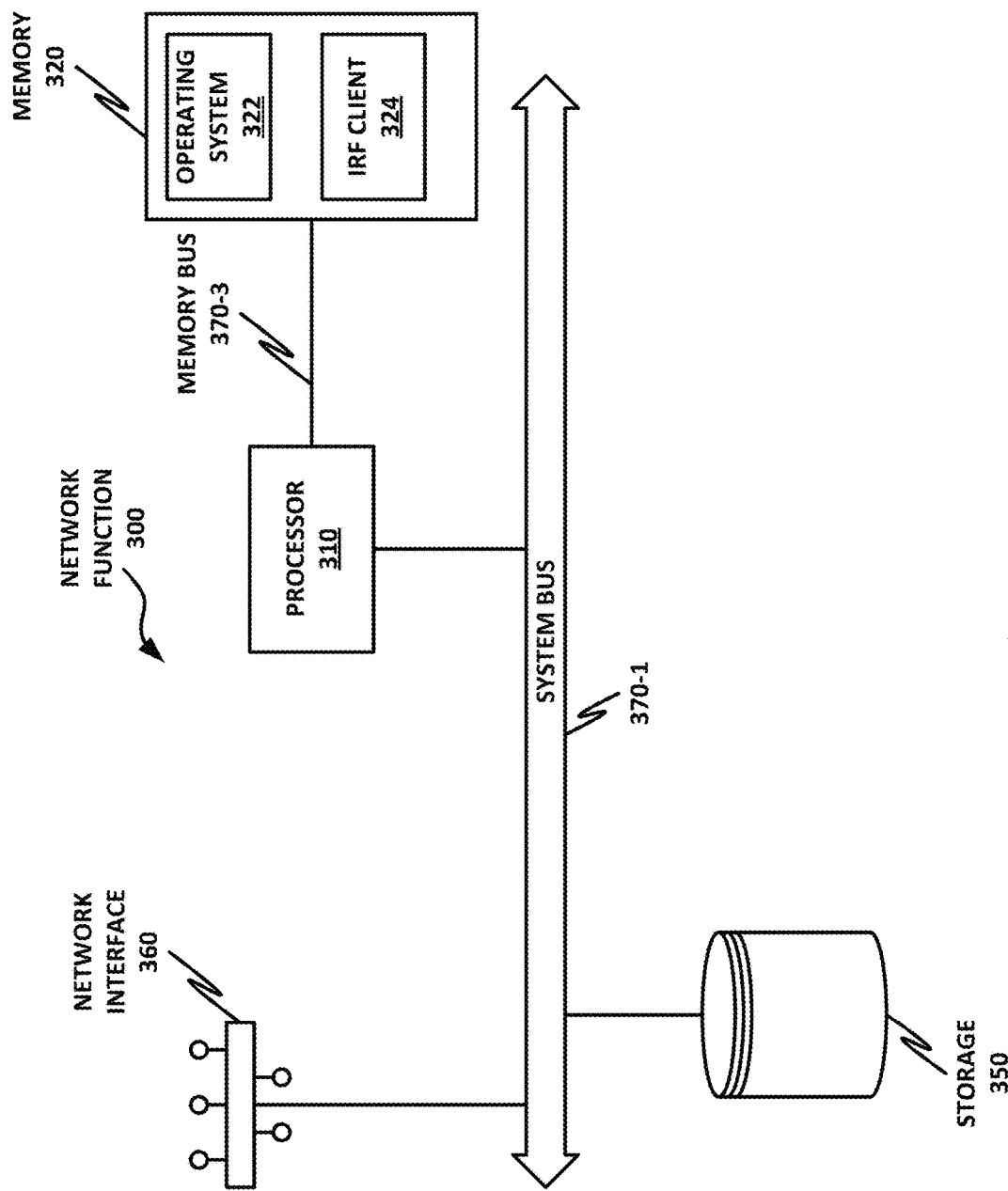
FIG. 3 is a block diagram of a user equipment (UE)-class device according to one or more examples of the present specification.

FIG. 3 is a block diagram of computing device according to one or more examples of the present Specification, which may be configured as a network function 300. Network function 300 may be any suitable computing device. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

Network function 300 includes a processor 310 connected to a memory 320, having stored therein executable instructions for providing an operating system 322 and at least software portions of a IRF client 324. Other components of network function 300 include a storage 350, network interface 360, and peripheral interface 340. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 320 and storage 350, for example, in a single physical memory device, and in other cases, memory 320 and/or storage 350 are functionally distributed across many physical devices. In the case of virtual machines or hypervisors, all or part of a function may be provided in the form of software or firmware running over a virtualization layer to provide the disclosed logical function. In other examples, a device such as a network interface 360 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 310 is communicatively coupled to memory 320 via memory bus 370-3, which may be for example a direct memory access (DMA) bus by way of example, though other memory architectures are possible, including ones in which memory 320 communicates with processor 310 via system bus 370-1 or some other bus. Processor 310 may be communicatively coupled to other devices via a system bus 370-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 310 may be treated as only one core of a multi-core processor, or may be treated as the entire multi-core processor, as appropriate. In some embodiments, one or more co-processor may also be provided for specialized or support functions.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 320 may comprise a relatively low-latency volatile main memory, while storage 350 may comprise a relatively higher-latency non-volatile memory. However, memory 320 and storage 350 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 350 may be any species of memory 320, or may be a separate device. Storage 350 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 350 may be, or may include therein, a database or databases or data stored in other configurations, and may include a stored copy of operational software such as operating system 322 and software portions of IRF client 324. Many other configurations are also possible, and are intended to be encompassed within the broad scope of this Specification.

Network interface 360 may be provided to communicatively couple network function 300 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

IRF client 324, in one example, provides appropriate functions, procedures, and application programming interfaces (APIs) that allow network function 300 to communicatively couple to an IRF as described in this specification. IRF client 324 may be operable to carry out computer-implemented methods as described in this Specification. IRF client 324 may include one or more non-transitory computer-readable mediums having stored thereon executable instructions operable to instruct a processor to provide a UE engine. As used throughout this Specification, an "engine" includes any combination of one or more logic elements, of similar or dissimilar species, operable for and configured to perform one or more methods provided by IRF client 324. Thus, IRF client 324 may comprise one or more logic elements configured to provide methods as disclosed in this Specification. In some cases, IRF client 324 may include a special integrated circuit designed to carry out a method or a part thereof, and may also include software instructions operable to instruct a processor to perform the method. In some cases, IRF client 324 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that IRF client 324 may also include other hardware and software, including configuration files, registry entries, and interactive or user-mode software by way of non-limiting example.

In one example, IRF client 324 includes executable instructions stored on a non-transitory medium operable to perform a method according to this Specification. At an appropriate time, such as upon booting network function 300 or upon a command from operating system 322 or a user 120, processor 310 may retrieve a copy of IRF client 324 (or software portions thereof) from storage 350 and load it into memory 320. Processor 310 may then iteratively execute the instructions of IRF client 324 to provide the desired method.

Figure 4:
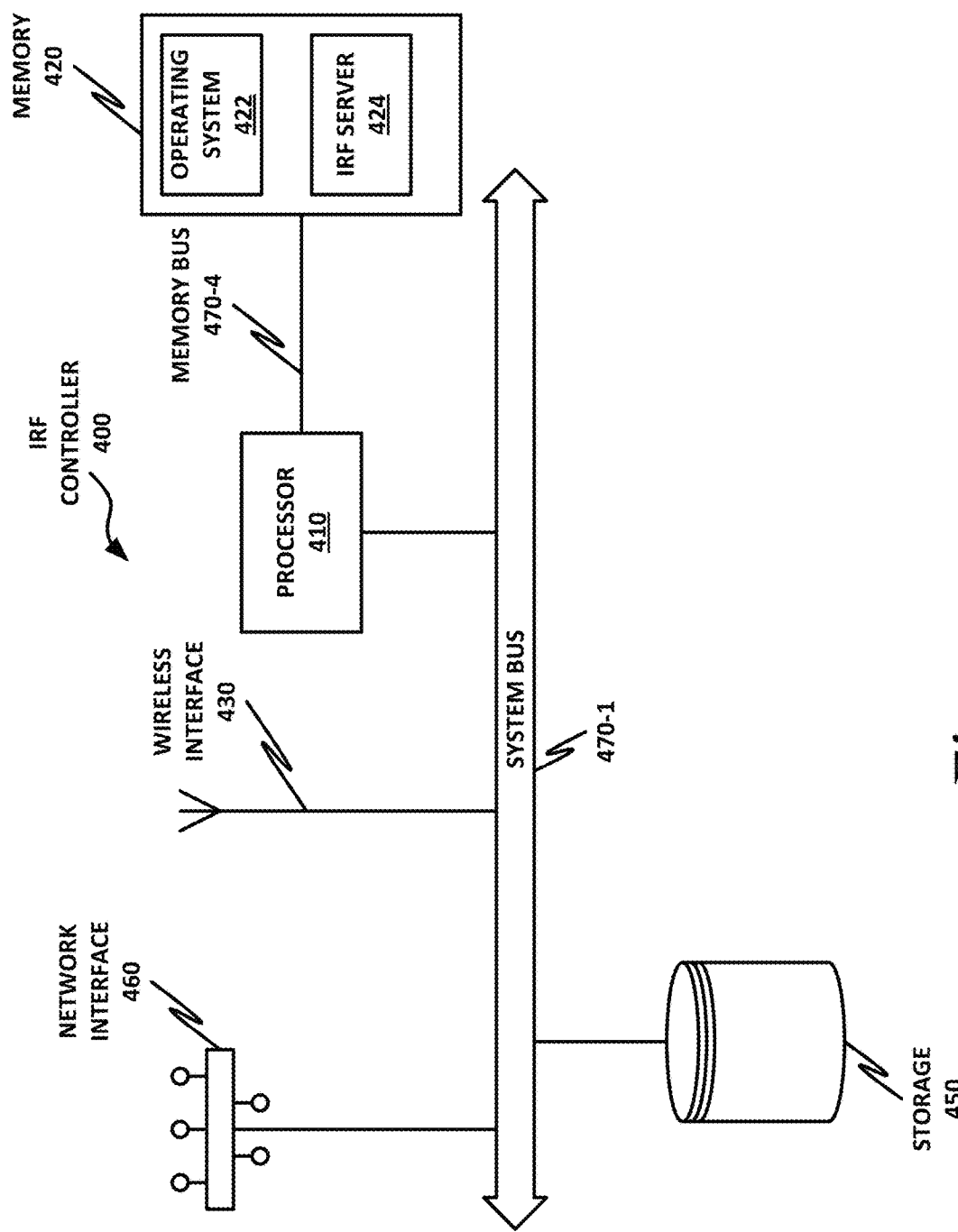
FIG. 4 is a block diagram of a server-class device according to one or more examples of the present specification.

FIG. 4 is a block diagram of a server-class device according to one or more examples of the present Specification, which may be configured as an IRF controller 400. IRF controller 400 may be any suitable computing device, as described in connection with FIG. 3. In general, the definitions and examples of FIG. 3 may be considered as equally applicable to FIG. 4, unless specifically stated otherwise. IRF controller 400 is described herein separately to illustrate that in certain embodiments, logical operations according to this Specification may be divided along a client-server model, wherein network function 300 provides certain localized tasks, while IRF controller 400 provides certain other centralized tasks. In one embodiment, all of the logical devices of FIG. 1 and FIG. 2, except user equipment 120 and endpoints 210, may be server-class devices. These devices may be physical, or may be implemented in some cases in a virtualized environment, such as a hypervisor.

IRF controller 400 includes a processor 410 connected to a memory 420, having stored therein executable instructions for providing an operating system 422 and at least software portions of a IRF server 424. Other components of IRF controller 400 include a storage 450, network interface 460, and peripheral interface 440. As described in FIG. 3, each logical block may be provided by one or more similar or dissimilar logic elements.

In an example, processor 410 is communicatively coupled to memory 420 via memory bus 470-3, which may be for example a direct memory access (DMA) bus. Processor 410 may be communicatively coupled to other devices via a system bus 470-1.

Processor 410 may be connected to memory 420 in a DMA configuration via DMA bus 470-3, or via any other suitable memory configuration. As discussed in FIG. 3, memory 420 may include one or more logic elements of any suitable type.

Storage 450 may be any species of memory 420, or may be a separate device, as described in connection with storage 250 of FIG. 2. Storage 450 may be, or may include therein, a database or databases or data stored in other configurations, and may include a stored copy of operational software such as operating system 422 and software portions of IRF server 424.

Network interface 460 may be provided to communicatively couple IRF controller 400 to a wired or wireless network, and may include one or more logic elements as described in FIG. 2.

IRF server 424 is an engine as described in FIG. 3 and, in one example, includes one or more logic elements operable to carry out computer-implemented methods for providing an IRF as described in more detail throughout this specification. Software portions of IRF server 424 may run as a daemon process.

IRF server 424 may include one or more non-transitory computer-readable mediums having stored thereon executable instructions operable to instruct a processor to provide a UE engine. At an appropriate time, such as upon booting IRF controller 400 or upon a command from operating system 222 or a user 120 or security administrator 150, processor 410 may retrieve a copy of IRF server 424 (or software portions thereof) from storage 450 and load it into memory 420. Processor 410 may then iteratively execute the instructions of IRF server 424 to provide the desired method.

Figure 5:
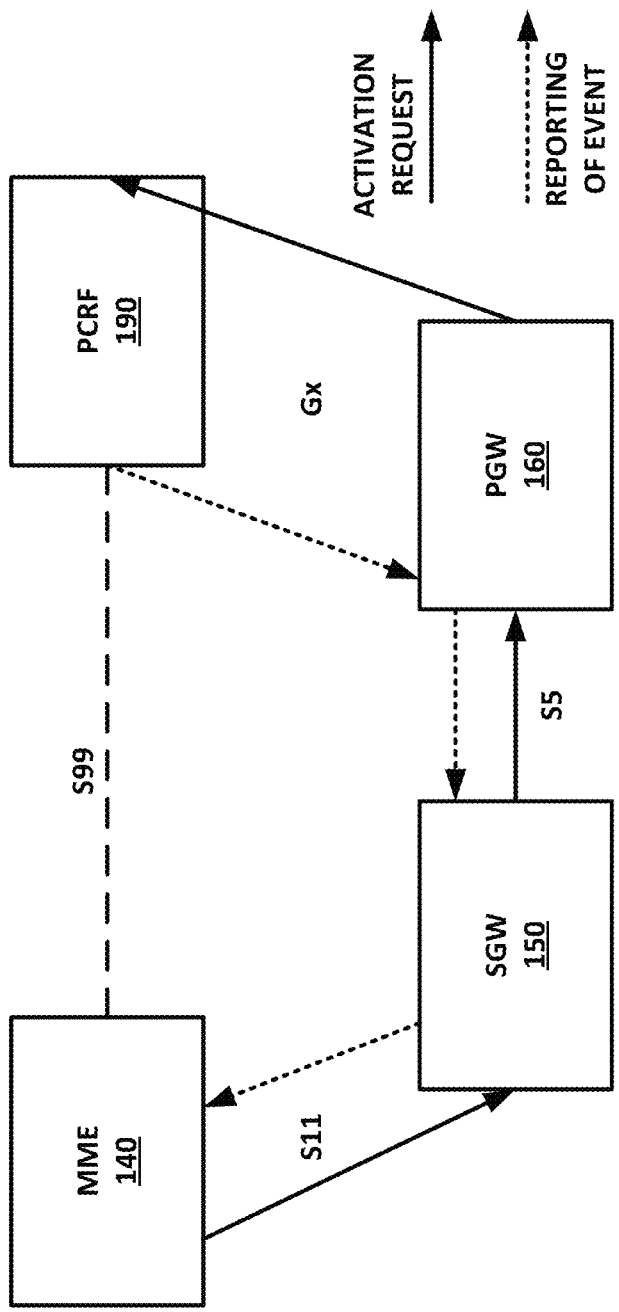
FIG. 5 is a block diagram illustration signal flow in a legacy communication model according to one or more examples of the present specification.

FIG. 5 is a block diagram illustrating legacy communication in a point-to-point architecture according to one or more examples of the present specification. In this case, MME 140 wants to send an activation request to PCRF 190. According to ordinary practice in such network environments, there are an SGW 150 and PGW 160 provided, as described above.

However, there is no existing direct MME-to-PCRF interface in 3GPP. There is an MME-to-SGW interface S11. But once again, there is no SGW-to-PCRF direct interface. Instead, there is an SGW-to-PGW interface S5. Finally, PGW 160 has a direct interface Gx to PCRF 190.

Thus, for MME 140 to send an activation request to PCRF 190, it first sends the activation request to SGW 150 via interface S11. SGW 150 recognizes that the activation request is for a downstream PCRF, but has not direct involvement in the transaction. Thus, SGW 150 simply forwards the activation request to PGW 160 via interface S5.

PGW 160 also has no direct involvement in the activation request, so it simply passes the activation request to PCRF 190 via interface Gx. PCRF 190 now has received the activation request.

PCRF 190 acts according to the activation request, and then needs to send an event report to MME 140. However, PCRF 190 has no direct interface to MME 140. Thus, PCRF 190 forwards the event report to PGW 160 via interface Gx. PGW 160 has no direct involvement in the transaction, but recognizes that the event report needs to be forwarded, and so forwards the event report to SGW 150 via interface S5. SGW 150 similarly has no direct involvement in the transaction, but recognizes that the event report needs to be forwarded, and thus forwards the event report to MME 140 via interface S11.

Thus, for MME 140 to communicate with PCRF 190, four intermediary hops were required. None of these hops passed through an NF that had any meaningful involvement in the transaction or that needed any information from it. The intermediary NFs SGW 150 and PGW 160 simply acted as courier mules. This is not optimally efficient.

Traditionally, if many messages needed to be passed between MME 140 and PCRF 190, a new interface would be defined, such as the hypothetical and fictional S99 interface shown here. This is what has led to the proliferation of interfaces in the existing 3GPP architecture, with each NF needing to support several interfaces and several protocols. For example, a standards-compliant SGW must support no fewer than seven distinct interfaces and five distinct protocols. Furthermore, it takes time to submit and approve new interfaces, and once they are approved, network operators must make expensive equipment replaces or upgrades.

Figure 6:
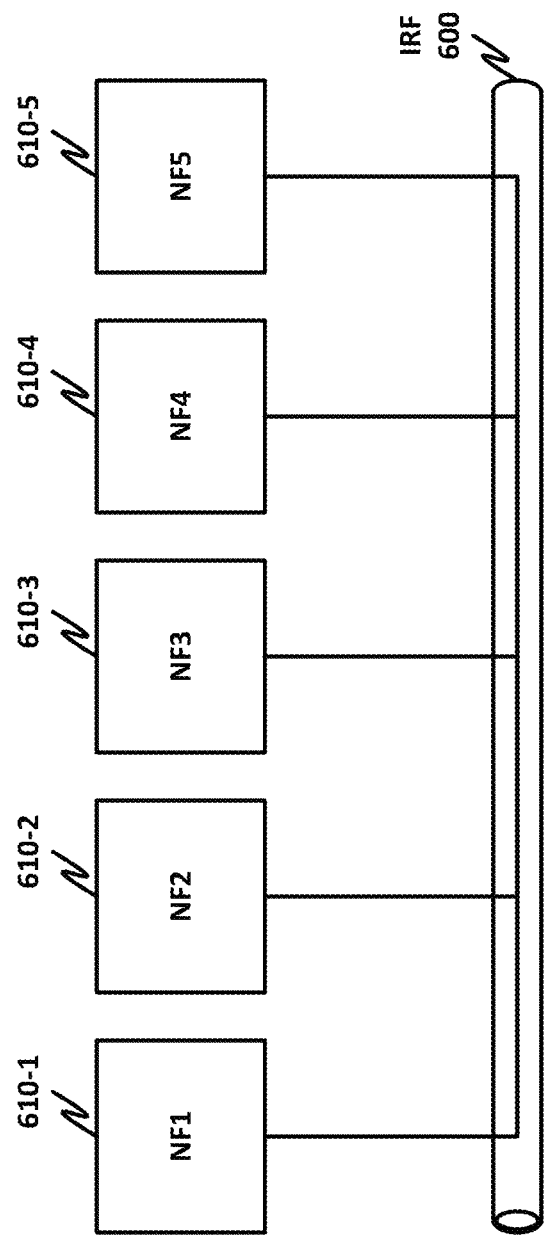
FIG. 6 is a block diagram of a scalable control plane employing an IRF according to one or more examples of the present specification.

FIG. 6 is a block diagram of a network employing an IRF 600 according to one or more examples of the present specification. In this example, five network functions are present, namely NF1 610-1, NF2 610-2, NF3 610-3, NF4 610-4, and NF5 610-5. This example considers only the function of the IRF itself. The NFs disclosed may be any suitable NFs or combinations of NFs, and the procedures defined and data passed between the NFs can be any suitable procedures and data.

IRF 600 permits multiple control plane access network functions to interface directly with multiple control plane core network functions. The principles of this solution can be extended to interconnect control plane access network and core network functions as well. Similarly, this solution can allow any control plane function to interface with any user plane function.

By way of illustration, this section will speak of NFs as "control plane core network functions." However, this is a nonlimiting example used to illustrate the utility of an IRF 600. For example, "control plane core network functions" in the EPC context include MME, control plane of PGW, PCRF, HSS, control plane of TDF, traffic steering stabilizing function (TSSF), RCAF, and service capability exposure function (SCEF), by way of nonlimiting example.

Figure 7:
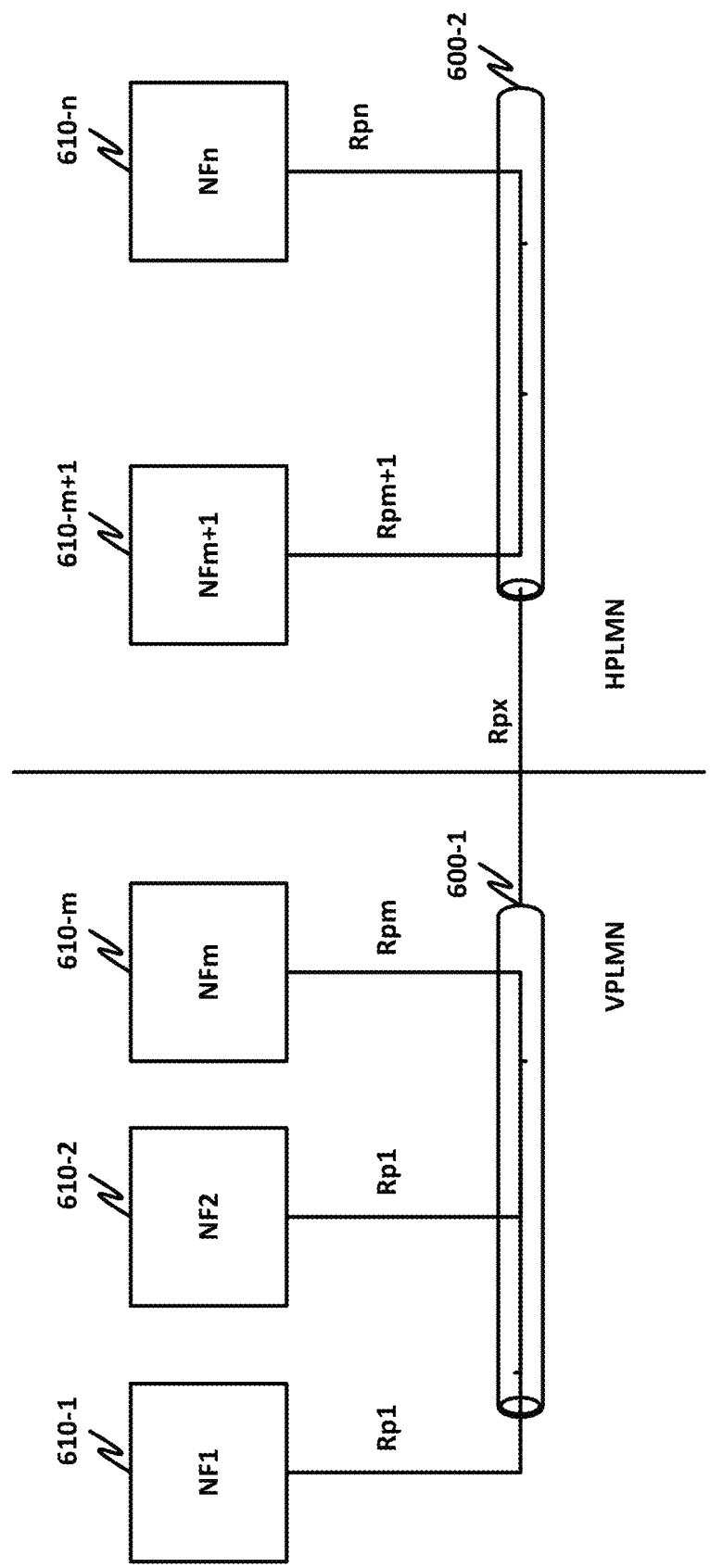
FIG. 7 is a block diagram of a scalable control plane employing an IRF according to one or more examples of the present specification.

With reference to FIG. 7, an embodiment is illustrated in which a plurality of NFs 610 are located on two different PLMNs, one being a visited PLMN (VPLMN), and the other being a home PLMN (HPLMN). This diagram illustrates a roaming model, with a home routed traffic scenario. Other reference models, such as local breakout, are also possible, and follow similar methodologies.

In this case, NF1 610-1 may need to communicate with NFn 610-*n*. Rp1 is a reference point between NF1 610-1 and IRF 600-1. Rpn is a reference point between NFn 610-*n* and IRF 600-2. Rpx: is an inter-PLMN reference point between the two IRFs 600. Note that additional reference points are shown between respective network functions and IRFs.

The reference points discussed above are, in one embodiment, 3GPP defined reference points, though other protocols and models may be used. Each reference points need not support all of the same messages that are supported by each other reference point. For example, NF1 100 may need support for procedure X as an integral part of its function. So Rp1 includes support for procedure X and related messages. But if NF2 610-2 has no need for procedure X, then Rp2 need not support messages for procedure X. However, the flexibility of the IRF includes the ability to easily and flexibly add support for this message later if the need arises.

Functions of IRF 600 include the following, by way of nonlimiting example.

IRF 600 may store the binding between a UE's identity and the interface layer identity (e.g., instance number) of each NF 610 that has an active session for the UE. For the NFs that may not interface with IRF 600 directly (e.g. in roaming scenario, as in FIG. 7), IRF 600 stores the identity of the remote PLMN's IRF through which the remote NFs are reachable.

IRF 600 updates the binding repository when the identity of the serving NF changes for a given UE, such as due to UE mobility, load re-balancing (i.e. scale-in or scale-out of VMs), or restoration reasons.

When an incoming Control plane message comes from a source NF 610, IRF 600 examines the message header to determine the identity of the UE that the message applies to, as well as the destination NF. To determine the UE's identity, IRF 600 may look up the internal binding repository to determine the interface layer identity (e.g., instance number) of the destination NF, or the identity of the remote IRF. If the binding does not exist, then the IRF selects an appropriate instance of the NF (e.g., based on load/overload information) or remote IRF (e.g., based on the PLMN information within the destination NF's logical identity) and updates its local repository with the appropriate binding. IRF 600 them routes the message accordingly.

In some embodiments, IRF 600 performs authorization of the message based on the operator's configuration. This may include checking the "message type," "source NF," and "destination NF" parameters from the message header, and either allowing or rejecting the message based on the local configuration. For example, if the operator's configuration prohibits NF1 610-1 from invoking certain message (such as "change of UE's APN-AMBR") towards NF4 610-4, then Rp1 may not support this procedure, and IRF 600 rejects the corresponding message.

In some cases, IRF 600 protects NFs during a "signaling storm" by performing overload control, e.g. pacing of messages sent to a given NF based on its load/overload condition.

If two NFs 610 need to communicate, but use different protocols, IRF 600 may have to perform protocol conversion while routing the message between two NFs.

Table 1 is an example of internal binding repository of an IRF, assuming that the network has network functions NF1 to NF5.

TABLE 1

| | | Internal Binding Repository | | | | |
|---|---|---|---|---|---|---|
| | | Binding repository at IRF | | | | |
| Network scenario | UE's session identity | NF1's identity | NF2's identity | NF3's identity | NF4's identity | NF5's identity |
| All NFs are in the same PLMN as IRF | UE-A | Instance1-logical-id-NF1 | Instance3-logical-id-NF2 | Instance2-logical-id-NF3 | Instance1-logical-id-NF4 | Instance1-logical-id-NF5 |
| All NFs are in the same PLMN as IRF; No active session for the UE in NF3, NF4 | UE-B | Instance1-logical-id-NF1 | Instance3-logical-id-NF2 | X | X | Instance1-logical-id-NF5 |

TABLE 1-continued

Internal Binding Repository

Binding repository at IRF

| Network scenario | UE's session identity | NF1's identity | NF2's identity | NF3's identity | NF4's identity | NF5's identity |
|---|---|---|---|---|---|---|
| NF4, NF5 are in different PLMN | UE-C | Instance3-logical-id-NF1 | Instance1-logical-id-NF2 | Instance1-logical-id-NF3 | Logical-id-remote-PLMN-IRF | Logical-id-remote-PLMN-IRF |
| NF4 in different PLMN; No active session for the UE in NF3, NF5 | UE-D | Instance2-logical-id-NF1 | Instance2-logical-id-NF2 | X | Logical-id-remote-PLMN-IRF | X |

NOTE 1:
The "instance number" is used to signify "an interface layer association" between the IRF and NF for a given UE's session. However, a different identity/format to reflect the same can also be used.
NOTE 2:
The UE's session identity could be anything that allows the NF to locate the UE's session uniquely while processing the received message, e.g. IMSI, IP address etc.

Figure 8:
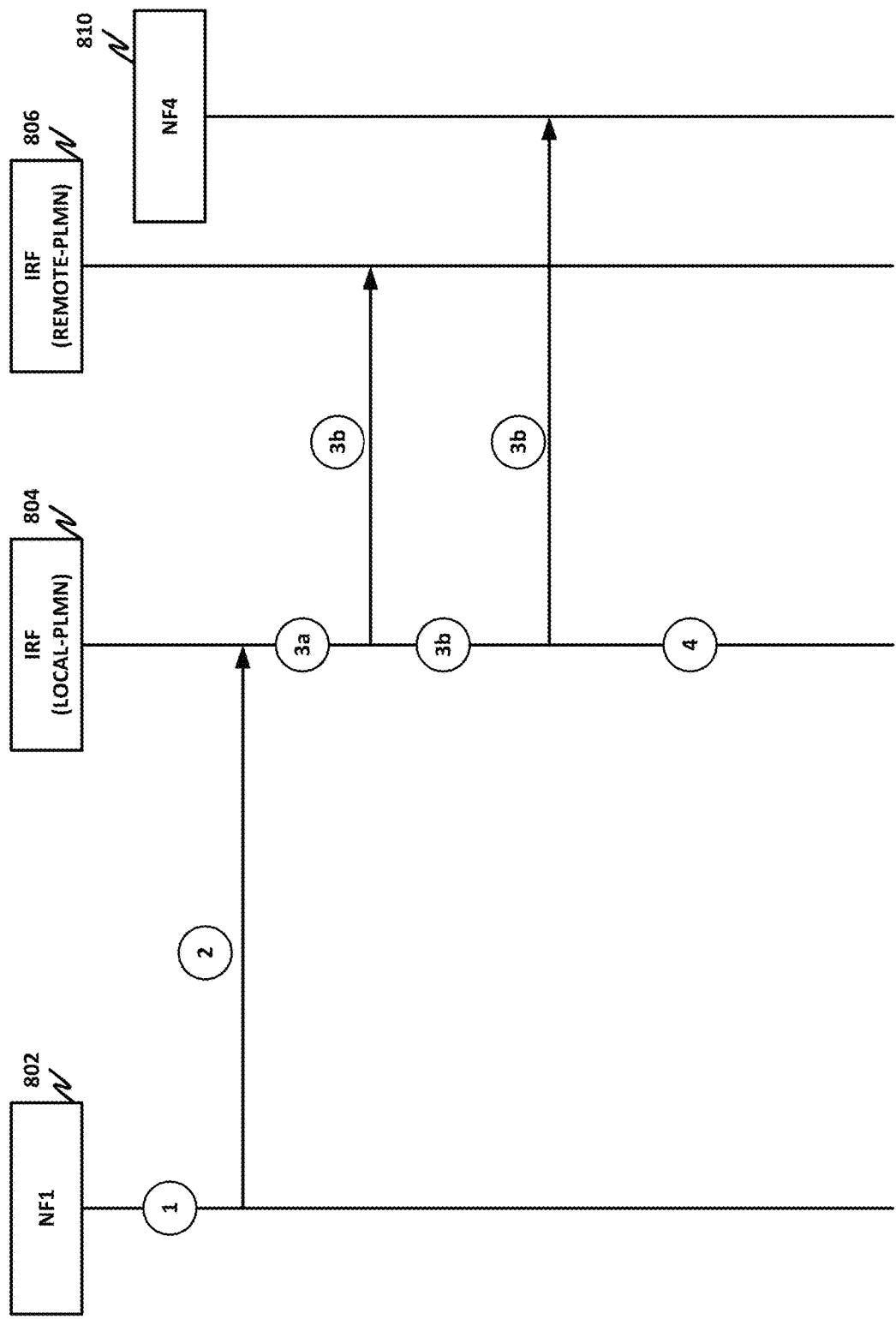
FIG. 8 is a signal flow diagram of basic routing in an IRF according to one or more examples of the present specification.

FIG. 8 is a signal flow diagram of a sample call flow for NF1 802 to send a message NF4 810 via IRFs 804 (local) and 806 (remote). Note that in this example, the NFs are in different PLMNs, but they could just as easily be in the same PLMN.

At 1, if the UE's session already exists in NF4, NF1 may simply use its logical identity (e.g. FQDN) to send the message to NF4. If the UE's session does not exist in NF4 (e.g. this message creates new session in NF4 as part of attach- or relocation-type of procedure) then NF1 selects NF4 and derives its logical identity, taking into account appropriate parameters.

At 2, NF1 sends the message, including the UE's identity and NF4's logical identity as "destination NF" in the message header and sends it to the IRF. For example:

| MESSAGE BODY | | |
|---|---|---|
| Header | | |
| SRC-NF | UE | DEST-NF |
| NF1 | UE Identity | dest-NF-logical-identity-NF4 |

The information related to IRF could be locally provisioned in the NFs.

At 3a, upon receipt of the message, IRF 804 examines the message header to derive the UE's identity and destination NF's logical identity. If the logical identity points to NF4 in a remote-PLMN, IRF 804 derives the identity of the IRF in the target PLMN, for example, based on local configuration or DNS based resolution. IRF 804 updates its internal binding to point to remote-PLMN's IRF 806 for NF4 810. IRF 804 then sends the message to IRF 806. IRF 806 then processes the message as described from 3b onwards.

At 3b, if the logical identity points to NF4 in the same PLMN, IRF 804 looks up its internal repository for the binding between the UE's identity and interface layer identity of NF4 810 (e.g., the instance number of NF4 810). If the binding exists, IRF 804 sends the message directly to the appropriate instance of NF4 810.

If the binding does not exist (this is the very first message for the UE's session to NF4), then IRF 804 selects the appropriate instance of NF4 810 (e.g., based on load/overload information) and sends the message to it. IRF 804 also updates its local repository with the binding between the UE's identity and NF's instance number. It is assumed in this example that each NF periodically sends a list of its active set of instances, along with the load/overload information to the IRF, though other models could be used as well.

At 4, as long as the UE's session remains active, IRF 804 maintains the binding between the UE's identity and NF4's identifier, i.e. either the instance number of NF4 in the local-PLMN, or identity of IRF 806 in the remote-PLMN. This binding allows IRF 804 to route any message to NF4 810 for the UE's session.

Figure 9:
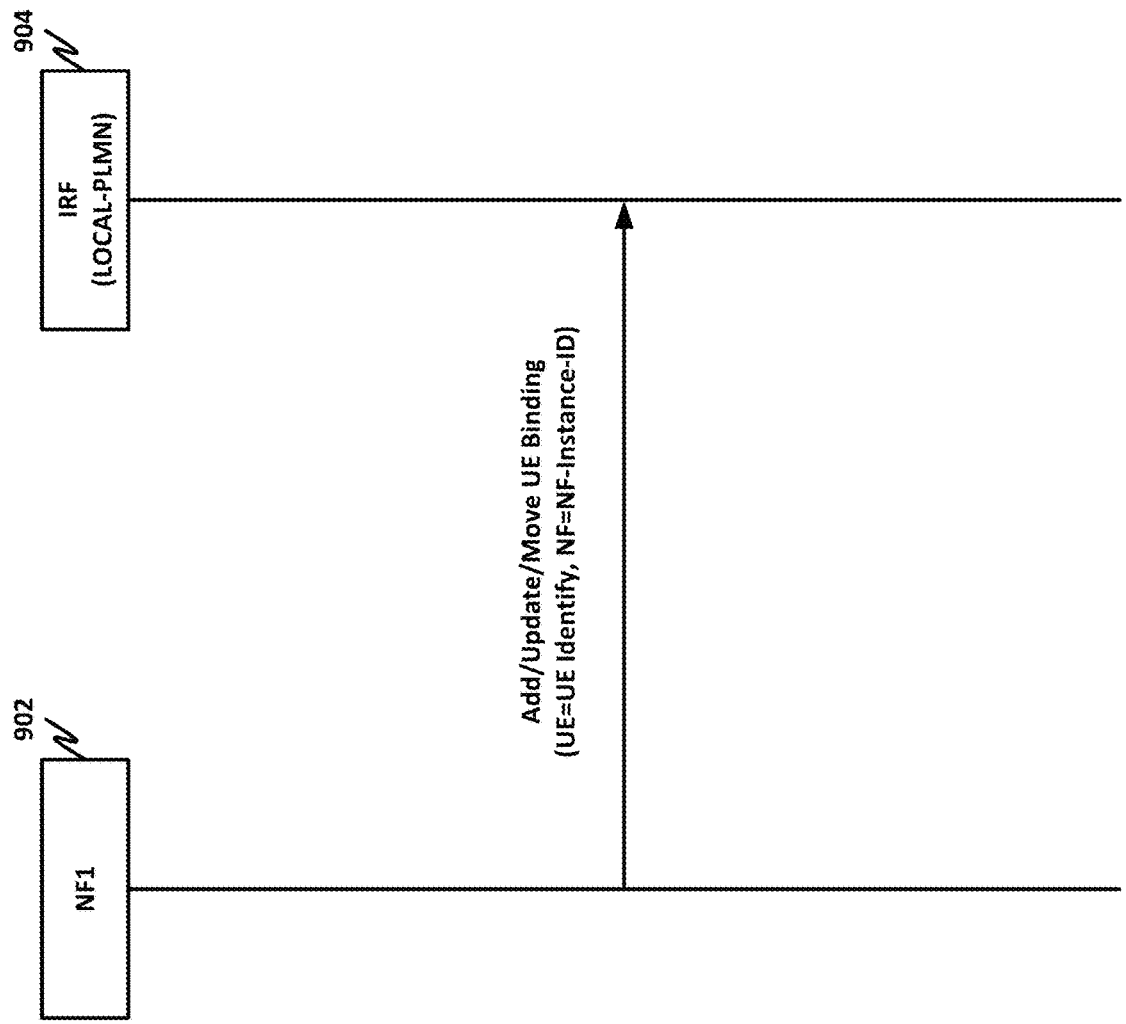
FIG. 9 is a signal flow diagram of a call flow of UE-NF binding management according to one or more examples of the present specification.

FIG. 9 is a signal flow diagram of a sample call flow of the management of the binding between a UE's session and its corresponding serving NF (NF1 902), at the IRF (904).

When the UE's session is created at NF1 902, e.g., during procedures such as attach, new PDU session establishment, relocation, etc., the NF1 902 updates IRF 904 by sending an "Add UE binding" message. IRF 902 then creates new binding in its binding repository.

For updating an existing binding, NF1 902 sends an "Update UE binding" message to the IRF. Correspondingly, IRF 904 updates the binding repository. This could take place if the NF changes its instance for an existing UE's session, e.g., due to scale-in, scale-out or restoration feature.

When the existing UE's session is released by NF1 902, e.g., during relocation or PDU session release procedures, NF1 902 sends a "Remove UE binding" message to IRF 904. IRF 904 clears its binding repository for the UE's session.

The above messages can be sent independently or by piggybacking on other relevant messages, e.g., while sending a "PDU session establishment" message to NF2, NF1 can piggyback an "Add UE binding" message for creating binding between the UE's session and NF1's serving instance, at the IRF.

By way of example, there is disclosed a computing apparatus, comprising: a processor; a memory; a network interface to communicatively couple to a mobile data network; and an interconnection and routing function (IRF) server engine to: receive an incoming Control plane message from a source network function (NF) via the network interface; examine a header of the incoming Control plane message to determine a destination NF of the Control plane message; and route the Control plane message to the destination NF.

There is further disclosed an example, wherein the IRF server engine is further to identify in a binding repository a binding between an identity of a user equipment (UE) and a serving NF.

There is further disclosed an example, wherein the IRF server engine is further to determine that the binding does not exist, select an instance of the destination NF, and update the binding repository.

There is further disclosed an example, wherein the IRF server engine is further to determine that the destination NF is on a separate public land mobile network (PLMN), and forward the message to a second IRF associated with the second PLMN.

There is further disclosed an example, wherein the IRF server engine is further to perform authorization, comprising determining that the first NF is authorized to send the incoming Control plane message.

There is further disclosed an example, wherein the IRF server engine is further to provide a subscribe-notify framework.

There is further disclosed an example, wherein the IRF server engine is further to convert a protocol for the source NF to a protocol for the destination NF.

There is further disclosed an example of a method of providing interconnection and routing for a mobile data network, comprising: receiving via a network interface for the mobile data network, an incoming Control plane message from a source network function (NF) via the network interface; examining a header of the incoming Control plane message to determine a destination NF of the Control plane message; and routing the Control plane message to the destination NF.

There is further disclosed an example, further comprising identifying in a binding repository a binding between an identity of a user equipment (UE) and a serving NF.

There is further disclosed an example, further comprising determining that the binding does not exist, select an instance of the destination NF, and update the binding repository.

There is further disclosed an example, further comprising determining that the destination NF is on a separate public land mobile network (PLMN), and forward the message to a second IRF associated with the second PLMN.

There is further disclosed an example, further comprising performing authorization, comprising determining that the first NF is authorized to send the incoming Control plane message.

There is further disclosed an example, further comprising providing a subscribe-notify framework.

There is further disclosed an example, further comprising converting a protocol for the source NF to a protocol for the destination NF.

There is further disclosed an example of one or more tangible, non-transitory computer-readable storage mediums having stored thereon executable instructions for providing an interconnection and routing function (IRF) server for a mobile network, the IRF server operable for: receiving via a network interface for the mobile data network, an incoming Control plane message from a source network function (NF) via the network interface; examining a header of the incoming Control plane message to determine a destination NF of the Control plane message; and routing the Control plane message to the destination NF.

There is further disclosed an example, wherein the IRF server is further operable for identifying in a binding repository a binding between an identity of a user equipment (UE) and a serving NF.

There is further disclosed an example, wherein the IRF server is further operable for determining that the binding does not exist, select an instance of the destination NF, and update the binding repository.

There is further disclosed an example, wherein the IRF server is further operable for determining that the destination NF is on a separate public land mobile network (PLMN), and forward the message to a second IRF associated with the second PLMN.

There is further disclosed an example, wherein the IRF server is further operable for performing authorization, comprising determining that the first NF is authorized to send the incoming Control plane message.

There is further disclosed an example, wherein the IRF server is further operable for converting a protocol for the source NF to a protocol for the destination NF.

The foregoing outlines features of several embodiments so that those skilled in the art may better understand the aspects of the present disclosure. In the foregoing, references to "an embodiment," "certain embodiments," "an example," "one or more examples," and similar are not intended to necessarily refer to the same embodiment. Some embodiments may contain one or more such features and exclude others, while other embodiments may include or exclude different features. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips. Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or subsection (f) of 35 U.S.C. section 112 (post-AIA) as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A computing apparatus, comprising:
    a processor;
    a memory;
    a network interface configured to communicatively couple to a mobile data network; and
    an interconnection and routing function (IRF) server engine configured to:
        provide a general interface between a plurality of Control plane network functions in a core network of the mobile data network, wherein the plurality of Control plane network functions each comprises a single reference point at the IRF server engine, and wherein each of the plurality of Control plane network functions provides a service on the mobile data network;
        receive an incoming Control plane message from a source network function (NF) via the network interface;
        examine a header of the incoming Control plane message to determine a destination NF of the Control plane message, wherein the destination NF is one of the plurality of Control plane network functions; and
        route the Control plane message to the destination NF using the single reference point of the destination NF, thereby bypassing the remaining plurality of Control plane network functions.

2. The computing apparatus of claim 1, wherein the IRF server engine is further to identify in a binding repository a binding between an identity of a user equipment (UE) and a serving NF.

3. The computing apparatus of claim 2, wherein the IRF server engine is further to determine that the binding does not exist, select an instance of the destination NF, and update the binding repository.

4. The computing apparatus of claim 1, wherein the IRF server engine is further to determine that the destination NF is on a separate public land mobile network (PLMN), and forward the message to a second IRF associated with the separate PLMN.

5. The computing apparatus of claim 1, wherein the IRF server engine is further to perform authorization, comprising determining that the source NF is authorized to send the incoming Control plane message.

6. The computing apparatus of claim 1, wherein the IRF server engine is further to provide a subscribe-notify framework.

7. The computing apparatus of claim 1, wherein the IRF server engine is further to convert a protocol for the source NF to a protocol for the destination NF.

8. The computing apparatus of claim 1, wherein the IRF server engine is further to protect NFs during a signaling storm, comprising providing overload control.

9. A method of providing interconnection and routing for a mobile data network, comprising:
    receiving, at an interconnection and routing function (IRF) server engine via a network interface for the mobile data network, an incoming Control plane message from a source network function (NF), wherein the IRF server engine provides a general interface between a plurality of Control plane network functions in a core network of the mobile data network, wherein the plurality of Control plane network functions each comprise a single reference point at the IRF, and wherein each of the plurality of Control plane network functions provides a service on the mobile data network;
    examining a header of the incoming Control plane message to determine a destination NF of the Control plane message, wherein the destination NF is one of the plurality of Control plane network functions; and
    routing the Control plane message the destination NF using the single reference point of the destination NF, thereby bypassing the remaining plurality of Control plane network functions.

10. The method of claim 9, further comprising identifying in a binding repository a binding between an identity of a user equipment (UE) and a serving NF.

11. The method of claim 10, further comprising determining that the binding does not exist, select an instance of the destination NF, and update the binding repository.

12. The method of claim 9, further comprising determining that the destination NF is on a separate public land mobile network (PLMN), and forward the message to a second IRF associated with the separate PLMN.

13. The method of claim 9, further comprising providing a subscribe-notify framework.

14. The method of claim 9, further comprising converting a protocol for the source NF to a protocol for the destination NF.

15. One or more tangible, non-transitory computer-readable storage mediums having stored thereon executable instructions for providing an interconnection and routing function (IRF) server for a mobile data network, wherein the IRF server is operable for:
    providing a general interface between a plurality of Control plane network functions in a core network of the mobile data network, wherein the plurality of Control plane network functions each comprises a single reference point at the IRF server, and wherein each of the plurality of Control plane network functions provides a service on the mobile data network;
    receiving via a network interface for the mobile data network, an incoming Control plane message from a source network function (NF) via the network interface;
    examining a header of the incoming Control plane message to determine a destination NF of the Control plane message, wherein the destination NF is one of the plurality of Control plane network functions; and
    routing the Control plane message the destination NF using the single reference point of the destination NF, thereby bypassing the remaining plurality of Control plane network functions.

16. The one or more tangible, non-transitory computer-readable mediums of claim 15, wherein the IRF server is further operable for identifying in a binding repository a binding between an identity of a user equipment (UE) and a serving NF.

17. The one or more tangible, non-transitory computer-readable mediums of claim 16, wherein the IRF server is further operable for determining that the binding does not exist, select an instance of the destination NF, and update the binding repository.

18. The one or more tangible, non-transitory computer-readable mediums of claim 15, wherein the IRF server is further operable for determining that the destination NF is on a separate public land mobile network (PLMN), and forward the message to a second IRF associated with the separate PLMN.

19. The one or more tangible, non-transitory computer-readable mediums of claim 15, wherein the IRF server is further operable for performing authorization, comprising determining that the source NF is authorized to send the incoming Control plane message.

20. The one or more tangible, non-transitory computer-readable mediums of claim 15, wherein the IRF server is further operable for converting a protocol for the source NF to a protocol for the destination NF.

* * * * *

UNITED STATES PATENT AND TRADEMARK OFFICE
CERTIFICATE OF CORRECTION

PATENT NO.         : 10,334,468 B2
APPLICATION NO.    : 15/285403
DATED              : June 25, 2019
INVENTOR(S)        : Nirav Salot et al.

Page 1 of 1

It is certified that error appears in the above-identified patent and that said Letters Patent is hereby corrected as shown below:

In the Specification

In Column 1, Line 9, after "reference" insert -- . --.

In Column 3, Line 13, after "introduce" insert -- . --.

In Column 8, Line 64, delete "Sha" and insert -- S6a --, therefor.

In Column 11, Line 19, after "network" insert -- . --.

Signed and Sealed this
Third Day of September, 2019

Andrei Iancu
*Director of the United States Patent and Trademark Office*